(12) United States Patent
Nilsson et al.

(10) Patent No.: US 10,495,393 B2
(45) Date of Patent: Dec. 3, 2019

(54) SYSTEM AND METHOD FOR IMPROVING THE PERFORMANCE OF A HEAT RECOVERY STEAM GENERATOR

(71) Applicant: GENERAL ELECTRIC TECHNOLOGY GMBH, Baden (CH)

(72) Inventors: John Martin Nilsson, Wettingen (CH); Stefano Bernero, Oberrohrdorf (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 554 days.

(21) Appl. No.: 15/066,239

(22) Filed: Mar. 10, 2016

(65) Prior Publication Data

US 2017/0261275 A1 Sep. 14, 2017

(51) Int. Cl.
*F28G 13/00* (2006.01)
*F01K 23/10* (2006.01)
(Continued)

(52) U.S. Cl.
CPC ............ *F28G 13/005* (2013.01); *F01K 23/10* (2013.01); *F01K 23/101* (2013.01); *F22B 37/48* (2013.01);
(Continued)

(58) Field of Classification Search
CPC ........ F01K 23/10; F01K 23/101; F22B 37/48; F22B 37/545; F23J 15/06; F23J 2219/10;
(Continued)

(56) References Cited

U.S. PATENT DOCUMENTS 3,693,353 A * 9/1972 Lemoine ............... F01D 25/007
60/685
4,421,067 A * 12/1983 Krowech .................. F28G 3/16
122/390
(Continued)

FOREIGN PATENT DOCUMENTS

DE 3243114 C1 5/1984
DE 102011054797 A1 5/2012
(Continued)

OTHER PUBLICATIONS

Extended European Search Report and Written Opinion issued in connection with corresponding EP Application No. 17159668.7 dated Sep. 19, 2017.

*Primary Examiner* — Jesse S Bogue
(74) *Attorney, Agent, or Firm* — Grogan, Tuccillo & Vanderleeden, LLP

(57) ABSTRACT

A heat recovery steam generator includes a gas inlet for receiving a flow of exhaust gas from a gas turbine, a gas outlet opposite the gas inlet, at least one heat exchanger intermediate the gas inlet and the gas outlet, the heat exchanger having a plurality of heat transfer surfaces configured to transfer heat from the exhaust gas to a fluid within the heat exchanger, and a valve associated with the heat exchanger and configured to regulate a flow of the fluid through the heat exchanger. The valve is controllable from an open position to a closed position to decrease the flow of the fluid through the heat exchanger in order to effect an increase in a temperature of the heat transfer surfaces of the heat exchanger to clean the heat transfer surfaces.

22 Claims, 2 Drawing Sheets

(51) Int. Cl.
*F22B 37/48* (2006.01)
*F22B 37/54* (2006.01)
*F23J 15/06* (2006.01)

(52) U.S. Cl.
CPC ............. *F22B 37/545* (2013.01); *F23J 15/06* (2013.01); *F23J 2219/10* (2013.01); *Y02E 20/16* (2013.01); *Y02E 20/363* (2013.01)

(58) Field of Classification Search
CPC ........ F28F 13/06; F28G 13/005; Y02E 20/16; Y02E 20/363
See application file for complete search history.

(56) References Cited

U.S. PATENT DOCUMENTS

| | | | | |
|---|---|---|---|---|
| 4,593,748 A * | 6/1986 | Kramb | ...................... | F01N 5/02 165/103 |
| 4,961,311 A * | 10/1990 | Pavel | ...................... | F01K 9/02 60/39.182 |
| 5,088,282 A * | 2/1992 | Kramb | ...................... | B03C 3/014 60/274 |
| 5,272,874 A * | 12/1993 | Paas | ...................... | B01D 53/944 165/95 |
| 6,626,237 B2 * | 9/2003 | Bergman | .............. | F22B 1/1807 165/232 |
| 7,890,197 B2 * | 2/2011 | Francino | ................ | F22B 37/48 122/1 R |
| 8,186,142 B2 * | 5/2012 | Narayan | ............... | F01K 23/106 60/39.182 |
| 8,713,907 B2 * | 5/2014 | Kidambi | ............... | F01K 23/068 55/315 |
| 8,778,041 B2 * | 7/2014 | Mitsui | .................. | B01D 53/343 55/282.3 |
| 8,959,885 B2 * | 2/2015 | Kidambi | ............. | C01B 17/0404 60/39.181 |
| 9,062,569 B2 | 6/2015 | Kraemer | | |
| 9,581,328 B2 * | 2/2017 | Schroeder | ................ | F22D 1/003 |
| 2004/0074238 A1 * | 4/2004 | Wantanabe | ........... | F02C 6/18 60/784 |
| 2010/0031625 A1 | 2/2010 | Narayan et al. | | |
| 2013/0031910 A1 | 2/2013 | Merchant et al. | | |
| 2013/0104519 A1 | 5/2013 | Zhang et al. | | |
| 2016/0025331 A1 | 1/2016 | Juretzek | | |
| 2016/0146557 A1 * | 5/2016 | Pitman | .................. | B08B 7/0071 134/19 |
| 2017/0254227 A1 * | 9/2017 | Guethe | ................. | G01N 21/65 |

FOREIGN PATENT DOCUMENTS

| | | |
|---|---|---|
| DE | 102013204396 A1 | 9/2014 |
| WO | 95/07751 A1 | 3/1995 |

* cited by examiner

SYSTEM AND METHOD FOR IMPROVING THE PERFORMANCE OF A HEAT RECOVERY STEAM GENERATOR

BACKGROUND

Technical Field

Embodiments of the invention relate generally to power generation systems and, more particularly, to a system and method for improving the performance of a heat recovery steam generator.

Discussion of Art

Gas turbines have been widely used to provide electric power, usually as a standby for both peak power and reserve power requirements in the utility industry. Gas turbines are preferred because of their rapid starting capability and low capital cost. Conventional gas turbines, however, operate with reduced thermal efficiency due to the high exit temperatures of the exhaust gas stream and the resulting thermal loss. Therefore, a gas turbine is often combined with a heat recovery steam generator to improve overall system efficiency.

As is known in the art, a heat recovery steam generator generates steam utilizing the energy in the exhaust from the gas turbine. In a cogeneration mode, steam produced from the heat recovery steam generator can be used for process applications, whereas in a combined-cycle mode, power may generated via a steam turbine generator.

All combustion processes utilizing fossil fuels have the potential for producing emissions such as nitrogen oxides ($NO_x$) and carbon monoxide. This also applies to the combustion process in a gas turbine where there are high temperatures and high excess air levels. Accordingly, the exit gas from the gas turbine which flows into and through the heat recovery steam generator contains a significant quantity of $NO_x$ and carbon monoxide. Stringent environmental regulations for carbon monoxide and nitrogen oxides have led to the development of selective catalyst reduction (SCR) systems that have been integrated into heat recovery steam generators. SCR systems function to remove nitrogen oxides, for example, through a selective catalytic reduction process. Typically, ammonia is injected into the flue or exhaust gas passing through the heat recovery steam generator, which is then absorbed onto a catalyst, to convert the nitrogen oxides into nitrogen and water. The treated exhaust gas may then be exhausted to atmosphere.

While existing SCR systems are generally effective in reducing emissions levels to comply with stringent standards, they can contribute to the formation of deposits on heat transfer surfaces within the heat recovery steam generator. These deposits are a common cause of reduced steam production, low steam temperatures, and degraded gas turbine performance, which may contribute to reduced electricity production and lost revenue. In particular, over time, fouling can bridge the gap between adjacent tube fins or other heat-transfer surfaces, further disrupting heat transfer and increasing gas-side pressure drop. In cases where heat recovery steam generator performance is severely compromised, the entire plant may require an extended forced outage to remove deposits from heat-transfer surfaces, or even replace an entire boiler module.

In view of the above, there is a need for a system and method for improving the performance of a heat recovery steam generator. In particular, there is a need for a system and method of removing deposits on heat transfer surfaces of a heat recovery steam generator in order to increase overall system efficiency.

BRIEF DESCRIPTION

In an embodiment, a heat recovery steam generator is provided. The heat recovery steam generator includes a gas inlet for receiving a flow of exhaust gas from a gas turbine, a gas outlet opposite the gas inlet, at least one heat exchanger intermediate the gas inlet and the gas outlet, the heat exchanger having a plurality of heat transfer surfaces configured to transfer heat from the exhaust gas to a fluid within the heat exchanger, and a valve associated with the heat exchanger and configured to regulate a flow of the fluid through the heat exchanger. The valve is controllable from an open position to a closed position to decrease the flow of the fluid through the heat exchanger in order to effect an increase in a temperature of the heat transfer surfaces of the heat exchanger to clean the heat transfer surfaces.

In another embodiment, a method of cleaning heat transfer surfaces in a heat recovery steam generator is provided. The method includes the steps of receiving a flow of exhaust gas from a gas turbine, directing the exhaust gas through a heat exchanger and to a gas outlet of the heat recovery steam generator, the heat exchanger including a plurality of heat transfer surfaces configured to transfer heat from the exhaust gas to a fluid within the heat exchanger, and decreasing a flow of the fluid through the heat exchanger for a predetermined time period, while maintaining the flow of exhaust through the heat exchanger, to increase a temperature of the heat transfer surfaces above a target temperature.

In yet another embodiment, a heat exchanger is provided. The heat exchanger includes a plurality of heat exchange tubes defining a flow pathway for a fluid, the heat exchange tubes including a plurality of heat transfer surfaces configured to transfer heat from an exhaust gas passing through the heat exchanger to the fluid within the tubes, and a valve associated with the heat exchanger and configured to regulate a flow of the fluid through the tubes of the heat exchanger. The valve is controllable from an open position to a closed position to decrease the flow of the fluid through the tubes of the heat exchanger in order to effect an increase in a temperature of the heat transfer surfaces of the heat exchanger to clean the heat transfer surfaces. The heat exchanger is located downstream from an ammonia injection grid of a heat recovery steam generator.

DRAWINGS

The present invention will be better understood from reading the following description of non-limiting embodiments, with reference to the attached drawings, wherein below:

DETAILED DESCRIPTION

Figure 1:
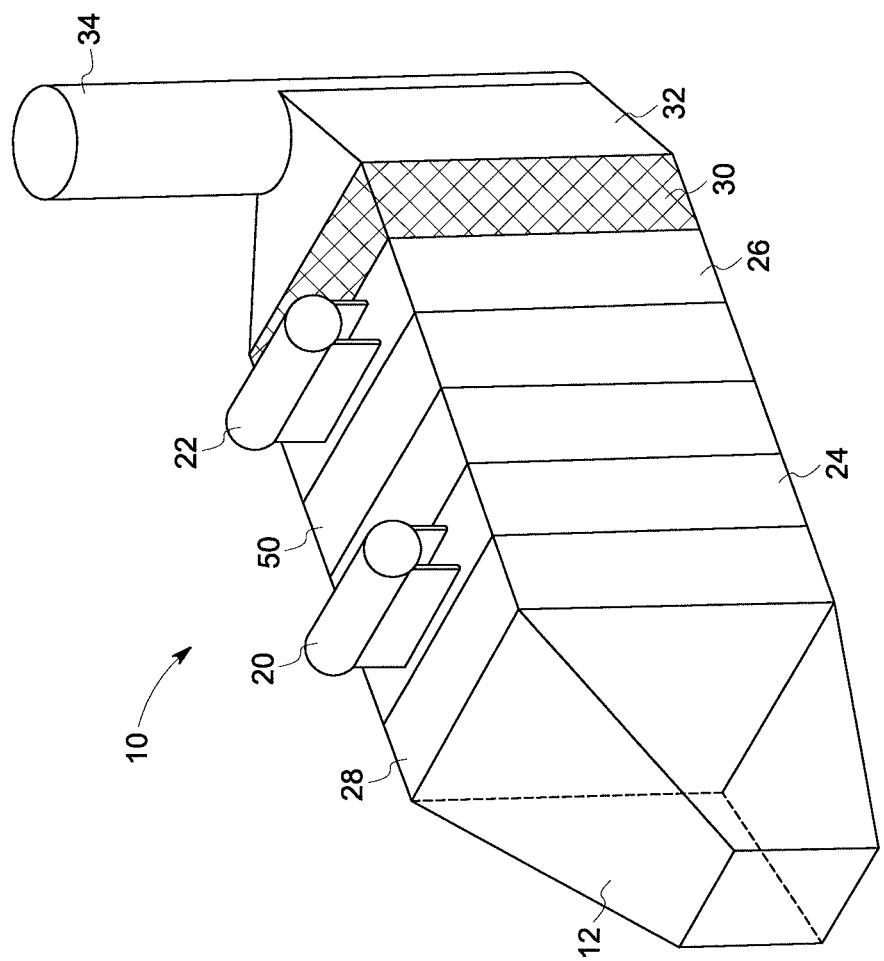
FIG. 1 is a schematic illustration of a heat recovery steam generator according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use in a heat recovery steam generator of a combined cycle or cogeneration power plant employing gas turbines, embodiments of the invention may also be applicable for use in other gas turbine applications where sulfur oxides are desired to be removed from exhaust gas.

As used herein, "upstream" and "downstream" refer to the flow direction of an exhaust gas from the gas turbine (i.e., exhaust gas flows from an upstream end of the heat recovery steam generator to a downstream end of the heat recovery steam generator). As used herein, "gas turbine" means a turbine driven by expanding hot gases produced by burning non-coal fuel such as, for example, petrol, natural gas, propane, diesel, kerosene, E85, biodiesel and biogas.

Moreover, as used herein, "electrical communication" or "electrically coupled" means that certain components are configured to communicate with one another through direct or indirect signaling by way of direct or indirect electrical connections. As used herein, "operatively coupled" refers to a connection, which may be direct or indirect. The connection is not necessarily being a mechanical attachment. As used herein, "communication" means that two or more components are connected in such a manner to allow for the propagation of signals between such components, such as, but not limited to, through wires/cables, fiber optics, and wireless transmitters/receivers.

Figure 2:
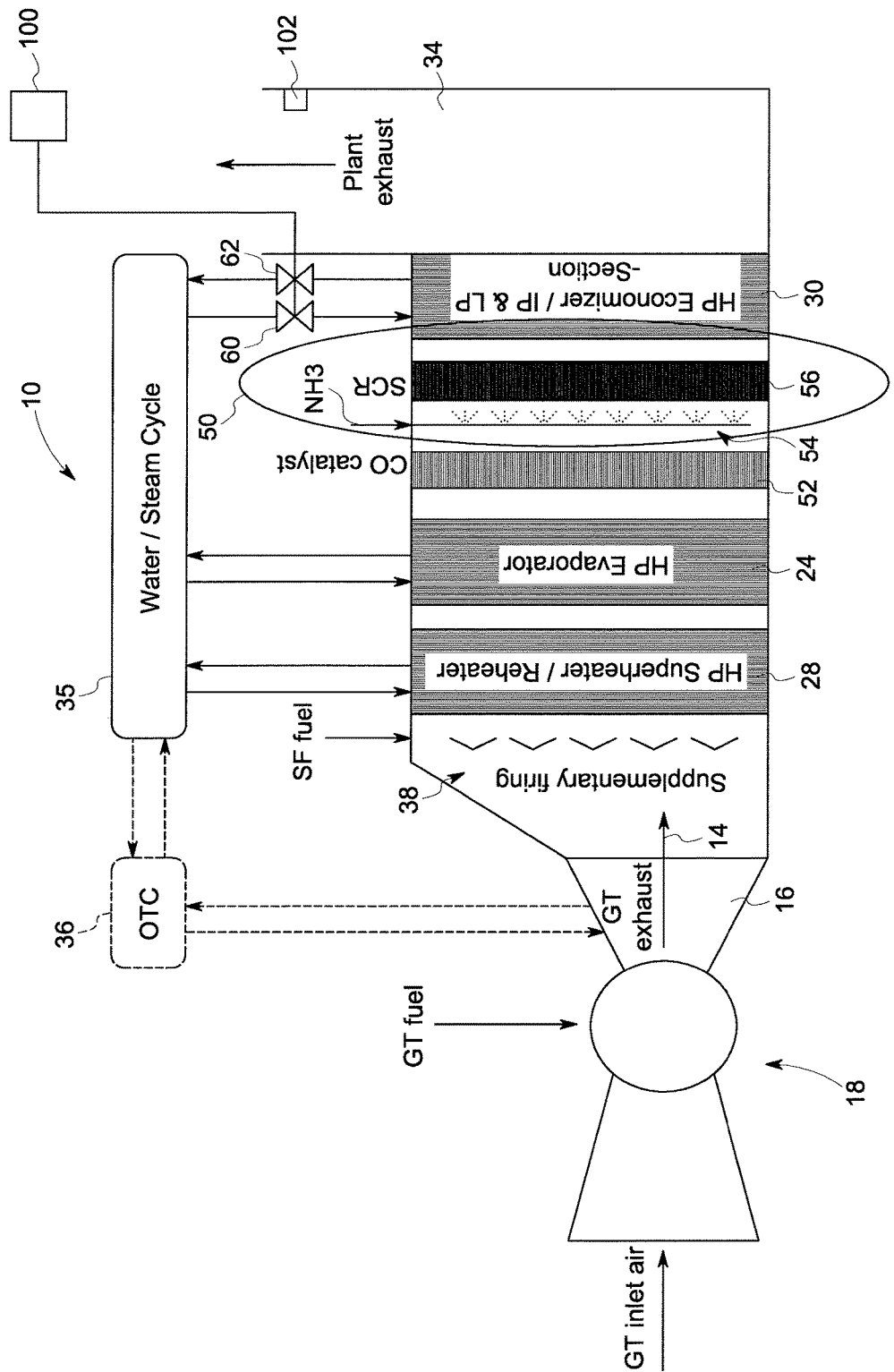
FIG. 2 is another schematic illustration of the heat recovery steam generator of FIG. 1.

Embodiments of the invention relate to a system and method for improving the performance of a heat recovery steam generator. FIGS. 1 and 2 illustrates an exemplary heat recovery steam generator ("HRSG") 10 in which embodiments of the invention may be deployed. The HRSG 10 has an inlet plenum 12 which is supplied with combustion/exhaust gas 14 from an exhaust duct 16 of a gas turbine 18 which powers a generator (not shown). HRSG 10 may be of any known design and includes, for example, a high pressure drum 20, a low pressure drum 22, and associated heat exchanger surfaces including high and low pressure evaporators 24, 26, respectively, superheater 28, and economizer 30 surfaces in a conventional manner. After passing through the heat exchangers, the exhaust gases are directed through a transition piece 32 and are emitted to atmosphere via stack 34, as is known in the art. While the HRSG 10 is illustrated as a dual pressure HRSG having high pressure and low pressure sections, the invention is equally applicable to HRSGs having any number of pressure sections including, for example, a triple pressure HRSG having three pressure sections (i.e. a high pressure section, a low pressure section and an intermediate pressure section).

Each pressure section of the HRSG 10 is configured to transfer energy from the exhaust gas passing therethrough to a fluid (e.g., a feedwater supply) to make superheated steam to drive a steam turbine. More specifically, the evaporators or boiler sections (e.g., evaporators 24, 26) function to vaporize water and produce steam. The evaporators may include a bank of finned tubes which extend into the exhaust path from steam drums located at the top of the HRSG 10. Boiler feedwater is supplied to the steam drum(s) at an appropriate pressure, and circulates through the finned tubes of the evaporator. The circulating water absorbs heat from the gas turbine exhaust 14. The amount of heat absorbed by the water, and the amount of heat released by the exhaust gas to generate steam is a product of the mass flow rate of the exhaust gas, the average gas specific heat capacity, the temperature difference across the evaporator, and the surface area of the finned tubes.

The economizers (e.g., economizer 30) are typically installed downstream of the evaporators with which they are associated and function to further lower the temperature of the exhaust gas. Economizers are, similar to the evaporators, finned-tube gas-to-water heat exchangers and, in addition to lowering the temperature of exhaust gas, function to preheat the feedwater prior to its entry into the steam drums associated with the evaporators.

The superheater 28 is located upstream of the associated evaporator and functions to add sensible heat to dry steam produced by the evaporator and steam drum, superheating it beyond the saturation temperature for use by the steam turbine. In an embodiment, the superheater may include either a single heat exchanger module or multiple heat exchanger modules.

As illustrated in FIG. 2, the circulation of water through the HRSG 10 to produce steam defines a water/steam cycle 35. In particular, as exhaust gas 14 passes through the HRSG 10 from gas turbine 18 (i.e., the upstream end) to the stack 34 (i.e., the downstream end), feedwater is circulated through the economizers, evaporators (and steam drums associated therewith) and superheaters in a generally reverse direction, from the stack end of the HRSG to the gas turbine end of the HRSG. As the upstream end of the HRSG is at a higher temperature than the downstream end, the feedwater increases in temperature as it travels from the downstream end to the upstream end, generating steam along the way in the water/steam cycle 35 for subsequent use, such as in a steam turbine.

As also shown therein, the HRSG 10 may include a once-through cooling system 36 that is configured to cool the air around the turbine blades in the first expansion stage of the gas turbine 18, in order to raise the temperature of the exhaust gas. Moreover, in an embodiment, the HRSG 10 may include a supplementary firing section 38 for further increasing the temperature of the exhaust gas 14 prior to entering the high pressure section of the HRSG 10.

With further reference to FIG. 2, the HRSG 10 includes a selective catalyst reduction system 50 that is configured to remove nitrogen oxides and carbon monoxide from the exhaust gas 14 before it exits the HRSG 10 through the stack 34. As best shown in FIG. 2, the SCR system 50 is located just upstream from the intermediate and low pressure sections of the HRSG 10 (i.e., between the evaporator of the high pressure section and the evaporator(s) of the intermediate and/or low pressure sections). In an embodiment, the SCR system 50 is located just upstream from the economizer 30.

In addition to the SCR system 50, a first catalytic reactor 52 is provided that is configured to oxidize carbon monoxide in the exhaust gas 14, to produce carbon dioxide ($CO_2$). The system 50 also includes an ammonia injection grid 54 downstream from the CO catalyst 52, which is configured to distribute vaporized ammonia ($NH_3$) into the flow of exhaust gas 14. The ammonia vapor mixes with the exhaust gas 14. This mixture then travels through a second catalytic reactor 56 where nitrogen oxides in the exhaust gas are converted into nitrogen and water. The SCR system 50 and the catalytic reactor 52, therefore, function to reduce both carbon dioxide and nitrogen oxide emissions.

In the first catalytic reactor 52, however, the oxidation catalyst used to convert the carbon monoxide into carbon dioxide may also increase the conversion of sulfur dioxide ($SO_2$) in the exhaust gas to sulfur trioxide ($SO_3$), which can react with excess ammonia from the ammonia injection grid 54 to form ammonium sulfate, which can collect on cold sections of the HRSG 10 downstream from the SCR system 50. In particular, these ammonium sulfate salt deposits may build up on the catalyst or on the finned tubes of any of the HRSG components downstream from the SCR system 50, including on the finned tubes of the economizer 30. The formation of these salt deposits, as discussed above, may result in a loss of gas turbine efficiency, loss in combined cycle efficiency, elevated stack temperatures and reduced catalyst lifetime.

In order to address this issue, the HRSG 10 includes a mechanism by which the surface temperatures of colder tube sections/modules of the HRSG 10 affected by salt deposits are selectively elevated. In particular, the HRSG 10 is provided a plurality of control valves that are selectively actuatable to control the flow of feedwater (e.g., the flow rate of feedwater) into and out of one or more of the high, low and intermediate pressure sections of the HRSG 10, in order to provide for the heat cleaning of heat transfer surfaces of the HRSG 10, as discussed in detail below. As used herein, the term "heat transfer surfaces" refers to the surfaces and components that facilitate the transfer of heat from the exhaust gas passing through the HRSG 10 to the feedwater within the tube sections/modules of the HRSG 10, which may include, for example, the tubes and fins of the boiler modules of the HRSG 10.

As illustrated in FIG. 2, the inlet/supply conduit of the economizer 30, for example, may be configured with a first control valve 60, and the outlet/discharge conduit may be configured with a second control valve 62. The control valves 60, 62 may be electrically connected to or otherwise in communication with to a control unit 100, such as a control unit configured to control operation of the HRSG 10 and the various components thereof. The control valves 60, 62 are controllable by the control unit 100 between an open state, where feedwater may pass through such valves, and a closed state, where feedwater is prevented from passing through such valves. In particular, the control valves 60, 62 are controllable to their respective closed states to essentially decouple the economizer from the water/steam cycle 35, as discussed hereinafter.

In operation, if salt deposits have formed on the finned tubes of the economizer 30, the control unit 100 may execute a heat cleaning cycle by controlling the valves 60, 62 to their closed positions while maintaining operation of the gas turbine 18 and a flow of exhaust gas 14 through the HRSG 10. In this closed state, feedwater is not permitted to enter or exit the economizer 30 (the feedwater already within the economizer 30 remains therein), which essentially decouples the economizer 30 from the water/steam cycle 35. Because water is prevented from cycling through the economizer 30, the economizer no longer functions as a heat sink to remove heat from the exhaust gas and carry it to other parts of the HRSG 10 for the generation of steam. In an embodiment, however, the HRSG 10 may continue to function as normal during the heat cleaning cycle, although the economizer 30 is bypassed.

During this heat cleaning cycle, as exhaust gas 14 continues to pass through the economizer 30 to the stack 34, the tubes and finned heat transfer surfaces of the economizer are heated by the hot exhaust gases. This is in contrast to normal operation where the continuous circulation of feedwater through the economizer 30 prevents the heat transfer surfaces thereof from substantially elevating in temperature. This heating of the heat transfer surfaces of the economizer results in thermal decomposition and/or evaporation of the salt deposits (or the precursors thereto) that may have collected on such heat transfer surfaces, resulting in cleaning and/or removal of the salt deposits without the need for chemical additives.

In an embodiment, heating of the heat transfer surfaces of the economizer 30 to above about 70° C. to about 100° C. with the exhaust gas 14 results in evaporation of sulfuric acid ($H_2SO_4$), which can cause corrosion of the economizer heat transfer surfaces. In addition, heating of the heat transfer surfaces above about 145° C. and, more particularly, above about 146.9° C., results in the thermal decomposition of ammonium bisulfate (ABS), and heating above about 235° C. to about 280° C. results in the thermal decomposition of ammonium sulfate (AS). Thus, by heating the heat transfer surfaces above these target temperatures, respectively, corrosion, ammonium bisulfate (ABS) and ammonium sulfate (AS) deposits on the heat transfer surfaces of the HRSG 10 may be mitigated or eliminated. This ensures that optimal heat transfer from the exhaust gas to the feedwater can take place, maximizing steam generation. In an embodiment, the target temperatures may deviate slightly from the values indicated herein, but are generally defined as the temperatures necessary to effect evaporation of sulfuric acid, and thermal decomposition of ABS and AS, respectively.

In an embodiment, the control unit 100 is configured to automatically initiate a heat cleaning cycle in dependence upon various monitored parameters of the HRSG 10. For example, in an embodiment, the heat cleaning cycle may be carried out upon detection of an increase in the pressure drop across the HRSG 10 above a threshold level. In another embodiment, the heat cleaning cycle may be carried out upon detection of a stack temperature in excess of a predetermined threshold. For example, fouling of the heat transfer surfaces of one or more of the HRSG 10 components may lead to inefficient extraction of heat from the exhaust gas passing therethrough, resulting in an increase in the temperature of the exhaust gas exiting the stack 34. Accordingly, a temperature sensor 102 within the stack 34 may monitor a temperature of the exiting exhaust gas and communicate such temperature to the control unit 100. When the detected temperature exceeds a preset threshold, it indicates that salt deposits have built up on the heat transfer surfaces of the economizer 30, and triggers a heat cleaning cycle to effect thermal decomposition of such salt deposits. In particular, the valves 60, 62 are controlled to their closed positions for a predetermined period of time so that the heat transfer surfaces of the economizer 30 are heated in order to effect evaporation and/or thermal decomposition of the salt deposits. After the predetermined period of time has elapsed, the valves 60, 62 may be opened and the HRSG 10 may to continue to operate as normal. In an embodiment, evaporation and/or decomposition may be controlled both by the time duration and by temperature (e.g., plant operation point and valve throttling position).

While the heat cleaning cycle of the invention has been described herein as inhibiting the formation of salt deposits on the heat transfer surfaces of the economizer 30 (i.e. on the finned-tubes of the economizer), the present invention is not so limited in this regard. In particular, heat cleaning of any of the components or modules of the low pressure section of the HRSG 10 and, indeed, any components or modules downstream from the SCR system 50, may be effected by selectively closing valves (not shown) associated with each such component or module in order to prevent or limit the flow of feedwater therethrough. For example, the economizer or evaporators of any of the low pressure section, intermediate pressure section and high pressure section may be configured with inlet and outlet control valves to selectively regulate the flow of water into and through such modules. As discussed above, closing of the valves essentially decouples the target module from the water/steam cycle 35, allowing the exhaust gas 14 passing therethrough to elevate the surface temperature of the heat transfer surfaces thereof, resulting in evaporation and/or thermal decomposition of salt deposits and other undesirable gases.

In an embodiment, the valves may be controlled to any position between a fully closed position and a fully open position to more precisely control the increase in temperature of the heat transfer surfaces of the module to be heat cleaned. In particular, partial closing of the valves allows some water to maintain circulation, allowing the target module to continue to operate in accordance with its intended purpose, while simultaneously facilitating a temperature increase necessary for heat cleaning.

As discussed above, the system and method of the invention therefore allows for the periodic heat cleaning of heat transfer surfaces of the HRSG 10. In particular, the system of the invention allows for the controlled elevation of the temperature of various heat transfer surfaces for a short amount of time in order to prevent the hardening of salt deposits thereon. Accordingly, the system allows the rate of salt deposition on the heat transfer surfaces to be reduced, while at the same time minimizing system disturbance.

In an embodiment, a heat recovery steam generator is provided. The heat recovery steam generator includes a gas inlet for receiving a flow of exhaust gas from a gas turbine, a gas outlet opposite the gas inlet, at least one heat exchanger intermediate the gas inlet and the stack, the heat exchanger having a plurality of heat transfer surfaces configured to transfer heat from the exhaust gas to a fluid within the heat exchanger, and a valve associated with the heat exchanger and configured to regulate a flow of the fluid through the heat exchanger. The valve is controllable from an open position to a closed position to decrease the flow of the fluid through the heat exchanger in order to effect an increase in a temperature of the heat transfer surfaces of the heat exchanger to clean the heat transfer surfaces. In an embodiment, the heat recovery steam generator further includes a control unit in communication with the valve. The control unit is configured to control the valve to a reduced flow position sufficient to decrease the flow of the fluid through the heat exchanger while maintaining the flow of exhaust gas through the heat exchanger. In an embodiment, the control unit is configured to control the valve in dependence upon a pressure drop across the heat recovery steam generator. In an embodiment, the control unit is configured to control the valve in dependence upon a temperature of the exhaust gas within an exhaust stack of the heat recovery steam generator. In an embodiment, the heat recovery steam generator includes a selective catalyst reduction system intermediate the gas inlet and the gas outlet. In an embodiment, the heat exchanger may be an economizer located downstream from the selective catalyst reduction system and upstream from the gas outlet. In an embodiment, the valve is a pair of valves including a first valve and a second valve, wherein the first valve regulates the flow of the fluid into the economizer, and wherein the second valve regulates the flow of the fluid out of the economizer. In an embodiment, the control unit is configured to maintain the valve in the reduced flow position for a predetermined period of time sufficient to increase the temperature of the heat transfer surfaces to at least about 70° C. to about 100° C. In an embodiment, the control unit is configured to maintain the valve in the reduced flow position for a predetermined period of time sufficient to increase the temperature of the heat transfer surfaces to at least about 235° C. to about 280° C. In an embodiment, the control unit is configured to maintain the valve in the reduced flow position for a predetermined period of time sufficient to increase the temperature of the heat transfer surfaces to at least about 145° C.

In another embodiment, a method of cleaning heat transfer surfaces in a heat recovery steam generator is provided. The method includes the steps of receiving a flow of exhaust gas from a gas turbine, directing the exhaust gas through a heat exchanger and to an exhaust stack of the heat recovery steam generator, the heat exchanger including a plurality of heat transfer surfaces configured to transfer heat from the exhaust gas to a fluid within the heat exchanger, and decreasing a flow of the fluid through the heat exchanger for a predetermined time period, while maintaining the flow of exhaust through the heat exchanger, to increase a temperature of the heat transfer surfaces above a target temperature. In an embodiment, the target temperature is at least about 70° C. to about 100° C. In an embodiment, the target temperature is at least about 235° C. to about 280° C. In an embodiment, the target temperature is at least about 145° C. In an embodiment, the step of decreasing the flow of the fluid through the heat exchanger includes adjusting a valve associated with an inlet of the heat exchanger. In an embodiment, the heat exchanger may be an economizer positioned downstream from a selective catalyst reduction system and upstream from the exhaust stack of the heat recovery steam generator. In an embodiment, the step of decreasing the flow of the fluid through the heat exchanger is carried out in response to a change in a pressure drop across the heat recovery steam generator in excess of a predetermined pressure drop threshold. In another embodiment, the step of decreasing the flow of the fluid through the heat exchanger is carried out in response to an increase in a temperature of the exhaust gas within the stack in excess of a predetermined stack temperature. In another embodiment, the step of decreasing the flow of the fluid through the heat exchanger is carried out only when the plant is operating between a given minimum and a given maximum load in order to optimize adjustment of the required temperature or impact of the valve closing on the life of components or the impact on plant performance.

In yet another embodiment, a heat exchanger is provided. The heat exchanger includes a plurality of heat exchange tubes defining a flow pathway for a fluid, the heat exchange tubes including a plurality of heat transfer surfaces configured to transfer heat from an exhaust gas passing through the heat exchanger to the fluid within the tubes, and a valve associated with the heat exchanger and configured to regulate a flow of the fluid through the tubes of the heat exchanger. The valve is controllable from an open position to a closed position to decrease the flow of the fluid through the tubes of the heat exchanger in order to effect an increase in a temperature of the heat transfer surfaces of the heat exchanger to clean the heat transfer surfaces. The heat exchanger is located downstream from an ammonia injection grid of a heat recovery steam generator. In an embodiment, the heat exchanger is an economizer located intermediate the ammonia injection grid and an exhaust stack of the heat recovery steam generator. In an embodiment, the heat exchanger includes a control unit in communication with the valve, the control unit being configured to control the valve to a reduced flow position sufficient to decrease the flow of the fluid through the heat exchanger while maintaining a flow of exhaust gas through the heat exchanger, wherein the control unit is configured to maintain the valve in the reduced flow position for a predetermined period of time sufficient to increase the temperature of the heat transfer surfaces to at least about 235° C. to about 280° C.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 122, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A heat recovery steam generator, comprising:
a gas inlet for receiving a flow of exhaust gas from a gas turbine;
a gas outlet opposite the gas inlet;
at least one heat exchanger intermediate the gas inlet and the gas outlet, the heat exchanger having a plurality of heat transfer surfaces configured to transfer heat from the exhaust gas to a fluid within the heat exchanger; and
a valve associated with the heat exchanger and configured to regulate a flow of the fluid through the heat exchanger, the valve being controllable from an open position to a closed position to decrease the flow of the fluid through the heat exchanger without reducing the flow of exhaust gas in order to effect an increase in a temperature of the heat transfer surfaces of the heat exchanger to clean the heat transfer surfaces, and controllable from the closed position to the open position to increase the flow of the fluid through the heat exchanger, while maintaining the flow of exhaust gas through the heat exchanger; and
a control unit in communication with the valve, the control unit being configured to control the valve to a reduced flow position sufficient to decrease the flow of the fluid through the heat exchanger while maintaining the flow of exhaust gas through the heat exchanger; and
wherein in the reduced flow position, the fluid is maintained in the heat exchanger.

2. The heat recovery steam generator of claim 1, wherein:
in the reduced flow position, the flow of fluid is maintained above a zero flow state while the flow of exhaust through the heat exchanger is maintained.

3. The heat recovery steam generator of claim 2, wherein:
the control unit is configured to control the valve in dependence upon a pressure drop across the heat recovery steam generator.

4. The heat recovery steam generator of claim 2, wherein:
the control unit is configured to control the valve in dependence upon at least one of a temperature of the exhaust gas within an outlet stack of the heat recovery steam generator and plant load.

5. The heat recovery steam generator of claim 1, further comprising:
a selective catalyst reduction system intermediate the gas inlet and the gas outlet;
wherein the heat exchanger is an economizer; and
wherein the economizer is located downstream from the selective catalyst reduction system and upstream from the gas outlet.

6. The heat recovery steam generator of claim 5, wherein:
the valve is a pair of valves including a first valve and a second valve;
wherein the first valve regulates the flow of the fluid into the economizer; and
wherein the second valve regulates the flow of the fluid out of the economizer.

7. The heat recovery steam generator of claim 2, wherein:
the control unit is configured to maintain the valve in the reduced flow position for a predetermined period of time sufficient to increase the temperature of the heat transfer surfaces to at least 70° C.

8. The heat recovery steam generator of claim 2, wherein:
the control unit is configured to maintain the valve in the reduced flow position for a predetermined period of time sufficient to increase the temperature of the heat transfer surfaces to at least 235° C.

9. The heat recovery steam generator of claim 2, wherein:
the control unit is configured to maintain the valve in the reduced flow position for a predetermined period of time sufficient to increase the temperature of the heat transfer surfaces to at least 145° C.

10. A method of cleaning heat transfer surfaces in a heat recovery steam generator, comprising the steps of:
receiving a flow of exhaust gas from a gas turbine;

directing the exhaust gas through a heat exchanger and to a gas outlet of the heat recovery steam generator, the heat exchanger including a plurality of heat transfer surfaces configured to transfer heat from the exhaust gas to a fluid within the heat exchanger;

decreasing a flow of the fluid through the heat exchanger for a predetermined time period, but maintaining the fluid within the heat exchanger, while maintaining the flow of exhaust through the heat exchanger, to increase a temperature of the heat transfer surfaces above a target temperature; and increasing the flow of the fluid through the heat exchanger after the predetermined time period, while maintaining the flow of exhaust through the heat exchanger.

11. The method according to claim 10, wherein:
the target temperature is at least 70° C.

12. The method according to claim 10, wherein:
the target temperature is at least 235° C.

13. The method according to claim 10, wherein:
the target temperature is at least 145° C.

14. The method according to claim 10, wherein:
the step of decreasing the flow of the fluid through the heat exchanger includes adjusting a valve associated with an inlet of the heat exchanger.

15. The method according to claim 10, wherein:
the heat exchanger is an economizer positioned downstream from a selective catalyst reduction system and upstream from the gas outlet of the heat recovery steam generator.

16. The method according to claim 10, wherein:
the step of decreasing the flow of the fluid through the heat exchanger is carried out in response to a change in a pressure drop across the heat recovery steam generator in excess of a predetermined pressure drop threshold.

17. The method according to claim 10, wherein:
the step of decreasing the flow of the fluid through the heat exchanger is carried out in response to an increase in a temperature of the exhaust gas within a stack of the heat recovery steam generator in excess of a predetermined stack temperature.

18. The method according to claim 10, wherein:
the step of decreasing the flow of the fluid through the heat exchanger is carried out only if the plant is operating between a given minimum and a given maximum load.

19. The method according to claim 10, wherein:
the step of decreasing the flow of fluid through the heat exchanger includes maintaining the flow of fluid through the heat exchanger above a zero flow state.

20. A heat exchanger, comprising:
a plurality of heat exchange tubes defining a flow pathway for a fluid, the heat exchange tubes including a plurality of heat transfer surfaces configured to transfer heat from an exhaust gas passing through the heat exchanger to the fluid within the tubes; and a valve associated with the heat exchanger and configured to regulate a flow of the fluid through the tubes of the heat exchanger the valve being controllable from an open position to a closed position to decrease the flow of the fluid through the tubes of the heat exchanger in order to effect an increase in a temperature of the heat transfer surfaces of the heat exchanger to clean the heat transfer surfaces, and controllable from the closed position to the open position to increase the flow of the fluid through the tubes of the heat exchanger, while maintaining the flow of exhaust gas through the heat exchanger; and a control unit in communication with the valve, the control unit being configured to control the valve to a reduced flow position sufficient to decrease the flow of the fluid through the tubes of the heat exchanger while maintaining the flow of exhaust gas through the heat exchanger;

wherein in the reduced flow position, the fluid is maintained in the tubes of the heat exchanger; and wherein the heat exchanger is located downstream from an ammonia injection grid of a heat recovery steam generator.

21. The heat exchanger of claim 20, wherein:
wherein the control unit is configured to maintain the valve in the reduced flow position for a predetermined period of time sufficient to increase the temperature of the heat transfer surfaces to at least 235° C.

22. The heat exchanger of claim 20, wherein:
in the reduced flow position, the flow of fluid is maintained above a zero flow state while the flow of exhaust through the heat exchanger is maintained.

* * * * *